US012786636B2

(12) United States Patent
Tong et al.

(10) Patent No.: US 12,786,636 B2
(45) Date of Patent: *Nov. 3, 2026

(54) SPEAKER ARRANGEMENT REMOVING RESONANCE AND TEMPERATURE EFFECTS TO IMPROVE SOUND QUALITY

(71) Applicant: ShenZhen Luxshare Acoustics Technology Ltd., Shenzhen (CN)

(72) Inventors: ZhiHua Tong, Shenzhen (CN); ZhiHe Zeng, Shenzhen (CN)

(73) Assignee: SHENZHEN LUXSHARE ACOUSTICS TECHNOLOGY LTD., Shenzhen (CN)

(*) Notice: Subject to any disclaimer, the term of this patent is extended or adjusted under 35 U.S.C. 154(b) by 142 days.

This patent is subject to a terminal disclaimer.

(21) Appl. No.: 18/908,036

(22) Filed: Oct. 7, 2024

(65) Prior Publication Data

US 2025/0030986 A1 Jan. 23, 2025

Related U.S. Application Data

(63) Continuation of application No. 17/895,472, filed on Aug. 25, 2022, now Pat. No. 12,143,796.

(30) Foreign Application Priority Data

Jul. 13, 2022 (CN) ......................... 202210820494.2

(51) Int. Cl.

*H04R 9/06* (2006.01)
*H04R 1/28* (2006.01)

(Continued)

(52) U.S. Cl.

CPC ............. *H04R 9/06* (2013.01); *H04R 1/2896* (2013.01); *H04R 7/18* (2013.01); *H04R 7/20* (2013.01);

(Continued)

(58) Field of Classification Search

CPC .......... H04R 9/06; H04R 1/2896; H04R 7/18; H04R 7/20; H04R 9/025; H04R 9/043;

(Continued)

(56) References Cited

U.S. PATENT DOCUMENTS 10,764,687 B2 9/2020 Zhou et al.
12,143,796 B2* 11/2024 Tong ...................... H04R 9/046

FOREIGN PATENT DOCUMENTS

CN 103297904 B 9/2015
CN 111405438 A 7/2020

(Continued)

*Primary Examiner* — Andrew Sniezek

(74) *Attorney, Agent, or Firm* — Birch, Stewart, Kolasch & Birch, LLP

(57) ABSTRACT

A speaker, comprising a magnetic component, an outer frame, an elastic component, a vibrating component, and a voice coil. The magnetic component comprises a magnetic conductive carrying plate and a magnetic circuit module. The magnetic conductive carrying plate comprises two sidewalls and a bottom plate. The two sidewalls are disposed at two side edges of the bottom plate. The magnetic circuit module is disposed on the bottom plate. The outer frame is disposed on a periphery of the magnetic component. The elastic component is interconnected with the magnetic conductive carrying plate and the outer frame and is relatively disposed on two sides of the magnetic conductive carrying plate. The vibrating component is disposed at the outer frame and the magnetic component and the elastic component. The voice coil is disposed under the vibrating component and between the magnetic circuit module and the two sidewalls of the magnetic conductive carrying plate.

19 Claims, 8 Drawing Sheets

(51) Int. Cl.

| | |
|---|---|
| ***H04R 7/04*** | (2006.01) |
| ***H04R 7/18*** | (2006.01) |
| ***H04R 7/20*** | (2006.01) |
| ***H04R 9/02*** | (2006.01) |
| ***H04R 9/04*** | (2006.01) |

(52) U.S. Cl.
CPC ............. *H04R 9/025* (2013.01); *H04R 9/043* (2013.01); *H04R 9/045* (2013.01); *H04R 9/046* (2013.01); *H04R 9/063* (2013.01); *H04R 7/045* (2013.01); *H04R 2400/11* (2013.01); *H04R 2499/11* (2013.01)

(58) Field of Classification Search
CPC ........ H04R 9/045; H04R 9/046; H04R 9/063; H04R 7/045; H04R 2400/11; H04R 2499/11
See application file for complete search history.

(56) References Cited

FOREIGN PATENT DOCUMENTS

| | | | |
|---|---|---|---|
| CN | 113453128 | A | 9/2021 |
| CN | 114745643 | A | 7/2022 |

* cited by examiner

SPEAKER ARRANGEMENT REMOVING RESONANCE AND TEMPERATURE EFFECTS TO IMPROVE SOUND QUALITY

CROSS-REFERENCE TO RELATED APPLICATION

This application is a continuation application of U.S. patent application Ser. No. 17/895,472, filed on Aug. 25, 2022, which claims the priority benefit of Chinese Patent Application Serial Number 202210820494.2, filed on Jul. 13, 2022, the full disclosure of which is incorporated herein by reference.

BACKGROUND

Technical Field

The present disclosure relates to the technical field of speaker, particularly to a speaker.

Related Art

With the improvement of quality of living and the popularization of smart mobile devices, people are pursuing the functions of portable speakers to be capable of exquisitely processing the sound quality and stably playback of music. Conventional speakers are majorly composed of magnets, coils, and diaphragms, and could convert the vibration of electric current frequency into sound. To improve the performance of conventional speakers, resonance and heat dissipation are one of the issues to be solved.

SUMMARY

The embodiments of the present disclosure provide a speaker tended to solve the problem of poor quality of sound by undesired casing vibration due to resonance, and the problem of speaker failure as the inner temperature rises also by resonance.

In the first aspect, the present disclosure provides a speaker, comprising a magnetic component, an outer frame, an elastic component, a vibrating component, and a voice coil. The magnetic component comprises a magnetic conductive carrying plate and a magnetic circuit module. The magnetic conductive carrying plate comprises two sidewalls and a bottom plate. The two sidewalls are disposed at two side edges of the bottom plate. The magnetic circuit module is disposed on the bottom plate. The outer frame is disposed at a periphery of the magnetic component. The elastic component is interconnected with the magnetic conductive carrying plate and the outer frame. The elastic component is relatively disposed on two sides of the magnetic conductive carrying plate. The elastic component comprises two second elastic members. The two second elastic members are interconnected to the two sidewalls of the magnetic conductive carrying plate and the outer frame. The elastic component comprises a first connecting edge, a second connecting edge, and a bent part. The bent part is interconnected to the first connecting edge and the second connecting edge in a bent manner. The first connecting edge is fixedly connected to a top edge of one of the two sidewalls of the magnetic conductive carrying plate. The vibrating component is disposed at the outer frame. The vibrating component is disposed at the magnetic component and the elastic component. The voice coil is disposed under the vibrating component. The voice coil is disposed between the magnetic circuit module and the two sidewalls of the magnetic conductive carrying plate. Wherein the two sidewalls are distant from the outer frame by a first distance. The magnetic component is disposed in the outer frame through a suspended connection by the elastic component.

In one embodiment, the elastic component comprises two first elastic members that are interconnected to two ends of the magnetic conductive carrying plate not having the two sidewalls and the outer frame, respectively.

In one embodiment, each of the first elastic members comprises a securing bracket, a connecting arm, and a connecting bracket. The securing bracket is connected to the outer frame. One end of the connecting arm is connected to the securing bracket. The other end of the connecting arm is connected to the connecting bracket. The connecting bracket is connected to the magnetic conductive carrying plate.

In one embodiment, the connecting arm is a curved component. A side edge of the connecting bracket adjacent to the connecting arm comprises an avoidance notch.

In one embodiment, the bottom plate of the magnetic conductive carrying plate comprises an avoiding part corresponding to the avoidance notch of the connecting bracket. The avoidance notch is communicating with the avoiding part.

In one embodiment, the connecting bracket is bent toward the securing bracket. Two ends of the connecting bracket are fixedly connected to the bottom plate.

In one embodiment, an edge of the bottom plate extendingly protrudes in correspondence with the connecting bracket. The edge of the bottom plate is matchingly connected with one side of the connecting bracket.

In one embodiment, one end of the bottom plate corresponding to the connecting bracket comprises a notch, in which the connecting bracket is correspondingly assembled.

In one embodiment, at least one supporting bump extendingly protrudes from one side of the connecting bracket corresponding to the notch. The notch is provided with a connecting recess corresponding to the supporting bump. The supporting bump is engaged with the connecting recess.

In one embodiment, the speaker further comprises a damper disposed at the securing bracket of the first elastic member. The securing bracket is fixedly connected to the outer frame through the damper.

In one embodiment, the damper further comprises a main body and a securing bump. The securing bump is disposed at one side of the main body. The main body covers the securing bracket. The outer frame comprises a securing groove and a securing notch. The securing groove is in communication with the securing notch. The main body is embedded in the securing groove. The securing bump is embedded in the securing notch.

In one embodiment, the elastic component comprises two second elastic members interconnected to the two sidewalls of the magnetic conductive carrying plate and the outer frame.

In one embodiment, each of the second elastic members comprises a first connecting edge, a second connecting edge, and a bent part. The bent part is interconnected to the first connecting edge and the second connecting edge in a bent manner. An inner side of the outer frame comprises a connecting notch. The first connecting edge is fixedly connected to a top edge of one of the two sidewalls of the magnetic conductive carrying plate. The second connecting edge is fixedly connected in the connecting notch.

In one embodiment, the number of the bent parts is multiple. A partitioning hole is provided between every two bent parts.

In one embodiment, the first connecting edge covers the top edge of one of the two sidewalls of the magnetic conductive carrying plate.

In one embodiment, one side of the second connecting edge corresponding to the connecting notch further comprises a bump. The second connecting edge is embedded in the connecting notch. The bump is engaged above a sidewall of the connecting notch.

In one embodiment, the height of each of the sidewalls is equal to the height of the magnetic circuit module.

In one embodiment, the speaker comprises a bottom case disposed under the outer frame. The bottom case is distant from the bottom plate of the magnetic conductive carrying plate of the magnetic component by a second distance.

In one embodiment, the speaker comprises a bottom case disposed under the outer frame. The bottom case comprises an abutment top at a position corresponding to the damper. The abutting top abuts against the damper.

In one embodiment, the magnetic circuit module further comprises a magnetic body and a magnetic conductive plate. The magnetic body is disposed on the bottom plate. The magnetic conductive plate is disposed at the magnetic body.

In the embodiments of the present disclosure, a speaker is provided. The elastic component is interconnected between the magnetic component and the outer frame. When the magnetic component conducts electromagnetic induction to vibrate the voice coil and the vibrating component to sound, the magnetic component would vibrate by the same reactive force. At this time, as the vibration force of the magnetic component is transmitted to the outer frame through the elastic component, the vibration force is absorbed by the elastic component to reduce the influence on the outer frame. Thus, the vibrating component could be less influenced by the vibration of the outer frame.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
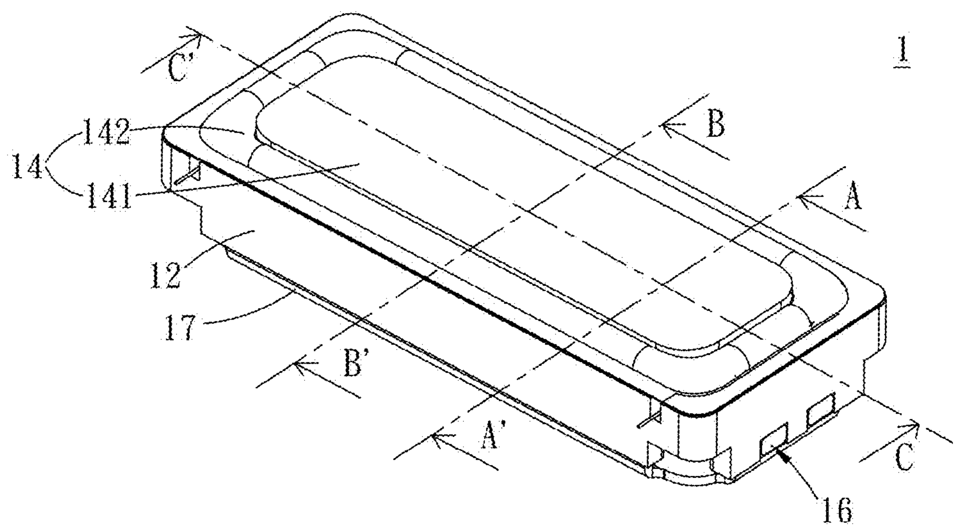
FIG. 1 is a perspective view of a speaker of the present disclosure.
Figure 2:
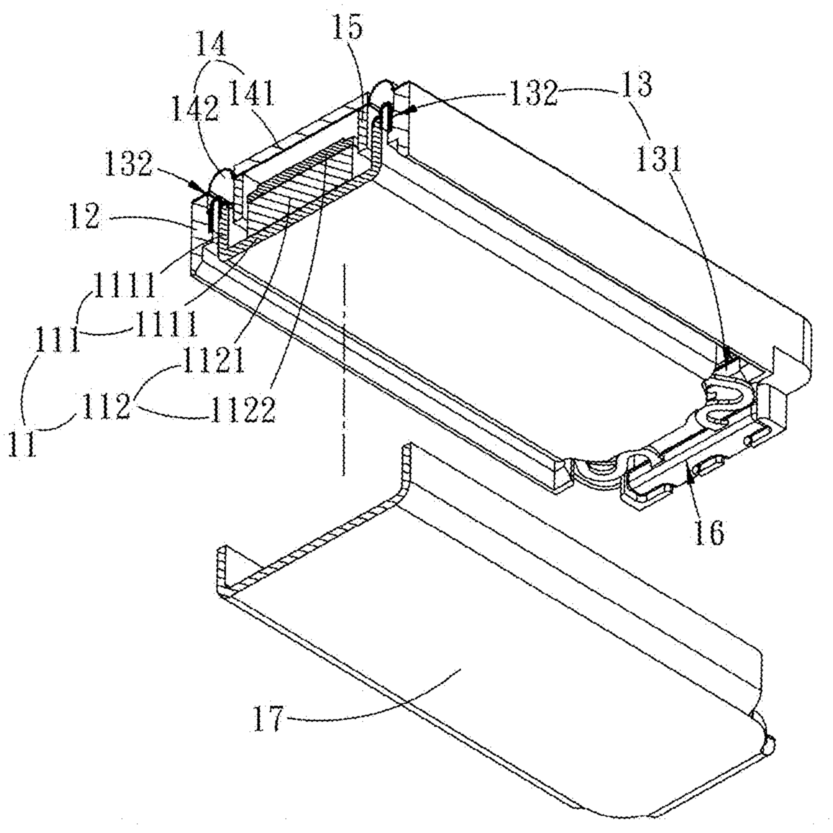
FIG. 2 is a cross-sectional exploded view along line A-A' of FIG. 1.
Figure 3:
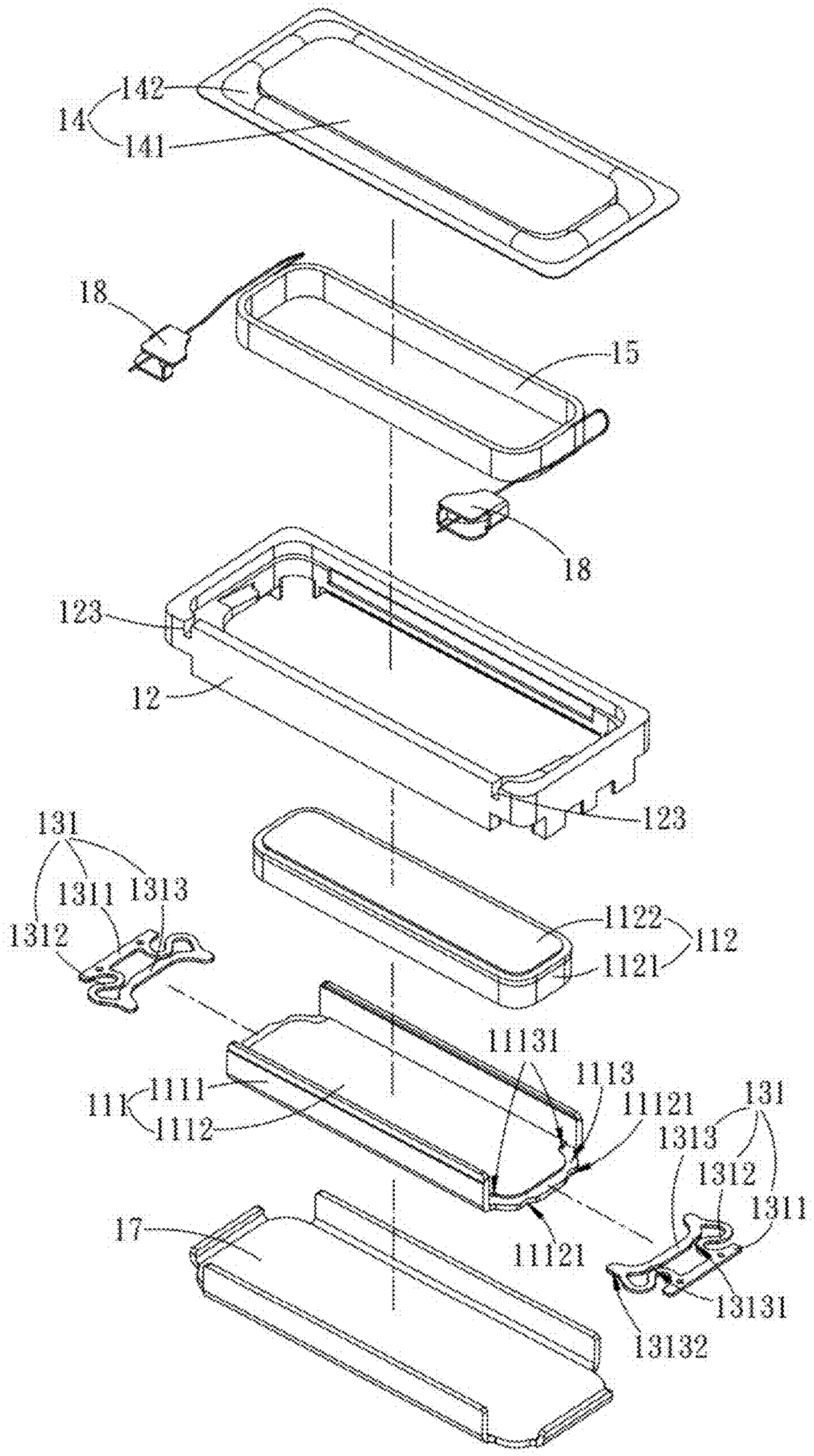
FIG. 3 is an exploded view of the speaker of the present disclosure.

FIG. 1 is a perspective view of a speaker of the present disclosure. FIG. 2 is a cross-sectional exploded view along line A-A' of FIG. 1. FIG. 3 is an exploded view of the speaker of the present disclosure. As shown in the figures, the present disclosure provides a speaker 1, which comprises: a magnetic component 11, an outer frame 12, an elastic component 13, a vibrating component 14, and a voice coil 15. The magnetic component 11 comprises a magnetic conductive carrying plate 111 and a magnetic circuit module 112. The magnetic conductive carrying plate 111 comprises two sidewalls 1111 and a bottom plate 1112. The two sidewalls 1111 are disposed at two sides of the bottom plate 1112, and the magnetic circuit module 112 is disposed on the bottom plate 1112. The outer frame 12 is disposed at a periphery of the magnetic component 11. The elastic component 13 is interconnected with the magnetic conductive carrying plate 111 and the outer frame 12, and is relatively disposed at two sides of the magnetic conductive carrying plate 111. The vibrating component 14 is disposed at the outer frame 12 and is disposed at the magnetic component 11 and the elastic component 13. The vibrating component 14 comprises a diaphragm 141 and a folded ring 142 disposed at a periphery of the diaphragm 141. The periphery of the folded ring 142 is connected to a periphery of the outer frame 12. The voice coil 15 is disposed under the vibrating component 14 and is disposed between the magnetic circuit module 112 and the two sidewalls 1111 of the magnetic conductive carrying plate 111. Wherein, the two sidewalls 1111 is distant from the outer frame 12 by a first distance D1 (see FIG. 12 and FIG. 13), and the magnetic component 11 is disposed in the outer frame 12 in a suspended connection through the elastic component 13.

The speaker 1 further comprises an electrical securing member 18, and the outer frame 12 further comprises an electrical opening 123. The electrical securing member 18 is secured to the outer frame 12 and corresponds to the position of the electrical opening 123. When two ends of the voice coil 15 are secured by the electrical securing member 18, the two ends of the voice coil 15 would pass through the electrical opening 123 and are connected to an external power source.

During power-on operation, when an audio current passes through the voice coil 15, the voice coil 15 would be forced by a magnetic field of the magnetic component 11, so that the voice coil 15 could drive the vibrating component 14 to actuate and sound. Meanwhile, the magnetic component 11 would also receive a reactive force from the voice coil 15. The force forced on the magnetic component 11 and on the voice coil 15 is equal in magnitude but opposite in direction, so that the magnetic component 11 could vibrate in the opposite direction relative to the voice coil 15. The magnetic component 11 is connected to the outer frame 12 through the elastic component 13, and the vibration force of the magnetic component 11 is transmitted to the outer frame 12 through the elastic component 13. Thus, the vibration force would be absorbed by the elastic component 13 to greatly reduce the influence on the outer frame 12, thereby reducing the influence of the vibration of the outer frame 12 on the vibrating component 14.

At this time, when the speaker 1 moves, since the magnetic component 11 maintains to be suspended in the outer frame 12 by the elastic component 13, the elastic component 13 could also be used as a damper to balance the movement or vibration of the magnetic component 11 in the speaker 1, so the elastic component 13 can also reduce the influence or interference from other external forces in the environment.

From the above description, it can be further learned that the application absorbs the vibration force during the operation of the speaker 1 through the elastic component 13. In addition, the operation between the magnetic component 11 and the voice coil 15 will also produce the force and reaction force, which will offset each other, thereby reducing the resonance; Moreover, the application can also reduce the vibration influence of the speaker 1 relative to the electronic equipment or device installed with the speaker 1.

Figure 4:
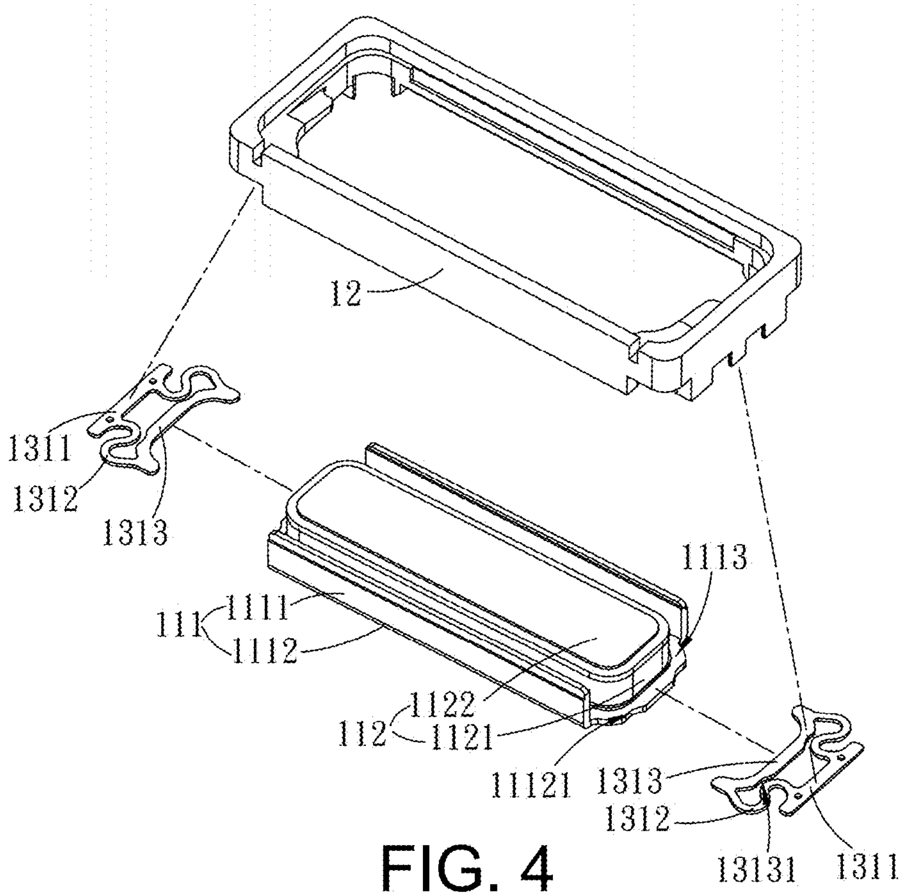
FIG. 4 is a partially exploded schematic diagram of a speaker of the first embodiment of the present disclosure.
Figure 5:
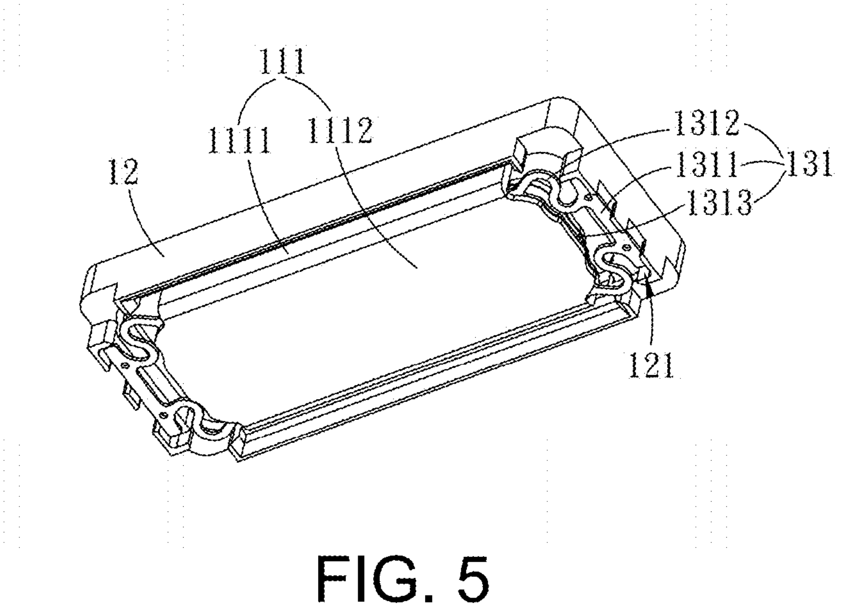
FIG. 5 is a partial schematic diagram of the speaker of the first embodiment of the present disclosure.

FIG. 4 is a partially exploded schematic diagram of a speaker of the first embodiment of the present disclosure. FIG. 5 is a partial schematic diagram of the speaker of the first embodiment of the present disclosure. As shown in the figures, in this embodiment, the elastic component 13 comprises two first elastic members 131 interconnected with two ends of a magnetic conductive carrying plate 111 not having two sidewalls 1111 and an outer frame 12. In this way, the two sidewalls 1111 of the magnetic conductive carrying plate 111 of the magnetic component 11 are distant from the outer frame 12 by a first distance D1. That is, the magnetic component 11 remains suspended in an inner space of the speaker 1.

Each of the first elastic members 131 comprises a securing bracket 1311, a connecting arm 1312, and a connecting bracket 1313. The securing bracket 1311 is connected to the outer frame 12, one end of the connecting arm 1312 is connected to the connecting bracket 1313, the other end of the connecting arm 1312 is connected to the connecting bracket 1313, and the connecting bracket 1313 is connected to the magnetic conductive carrying plate 111. The connecting bracket 1313 is bent toward the securing bracket 1311, two ends of the connecting bracket 1313 extend into a bottom plate 1112 of the magnetic conductive carrying plate 111, and two ends of the connecting bracket 1313 are fixedly connected to the bottom plate 1112 of the magnetic conductive carrying plate 111. Since the connecting bracket 1313 is extended and secured to an inner side of the bottom plate 1112 of the magnetic conductive carrying plate 111 on its two ends, at the connecting securing position of the connecting bracket 1313, a better balancing of the magnetic component 11 could be maintained. In this way, during vertical vibration of the magnetic component 11, a significant left-right swing can be avoided.

Besides, the connecting arm 1312 is an S-shaped and curved component. The structural shape of the connecting arm 1312 can be adjusted according to requirements. The shape of the connecting arm 1312 needs to be able to ensure that the vibration frequency of the entire magnetic component 11 should be similar to the vibration frequency at which the magnetic component 11 causes the voice coil 15 to drive the vibrating component 14 to vibrate, causing canceling of the two frequencies to avoid the vibration of the magnetic component 11 from affecting the vibration of the vibrating component 14 to sound. Besides, a side edge of the connecting bracket 1313 adjacent to the connecting arm 1312 comprises an avoidance notch 13131, so when the first elastic member 131 absorbs the vibration of the magnetic component 11, the up-down vibration or left-right shaking of the connecting arm 1312 of the first elastic member 131 would not be disturbed by the connecting bracket 1313 of the first elastic member 131. Meanwhile, the bottom plate 1112 of the magnetic conductive carrying plate 111 comprises an avoiding part 11121 corresponding to the avoidance notch 13131 of the connecting bracket 1313. The avoidance notch 13131 is in communication with the avoiding part 11121. The functional effect of the avoiding part 11121 is identical to that of the avoidance notch 13131, so it would not be repeated herein. The first elastic member 131 is made of stainless steel or other elastic materials.

Moreover, a side edge of the bottom plate 1112 of the magnetic conductive carrying plate 111 extendingly protrudes corresponding to the bending angle of the connecting bracket 1313 and can be matchingly connected to one side of the entire connecting bracket 1313. Besides, one end of the bottom plate 1112 of the magnetic conductive carrying plate 111 corresponding to the connecting bracket 1313 comprises a notch 1113, which is a corresponding installation notch corresponding to the connecting bracket 1313. The connecting bracket 1313 can be assembled in the notch 1113 correspondingly so that the first elastic member 131 can be stably installed to the bottom plate 1112 of the magnetic conductive carrying plate 111. Furthermore, at least one supporting bump 13132 extendingly protrudes from one side of the connecting bracket 1313 corresponding to the notch 1113, the notch 1113 is provided with a connecting recess 11131 corresponding to the supporting bump 13132, and the supporting bump 13132 is engaged with the connecting recess 11131. In this way, the first elastic member 131 can be stably connected to the bottom plate 1112 of the magnetic conductive carrying plate 111.

Figure 6:
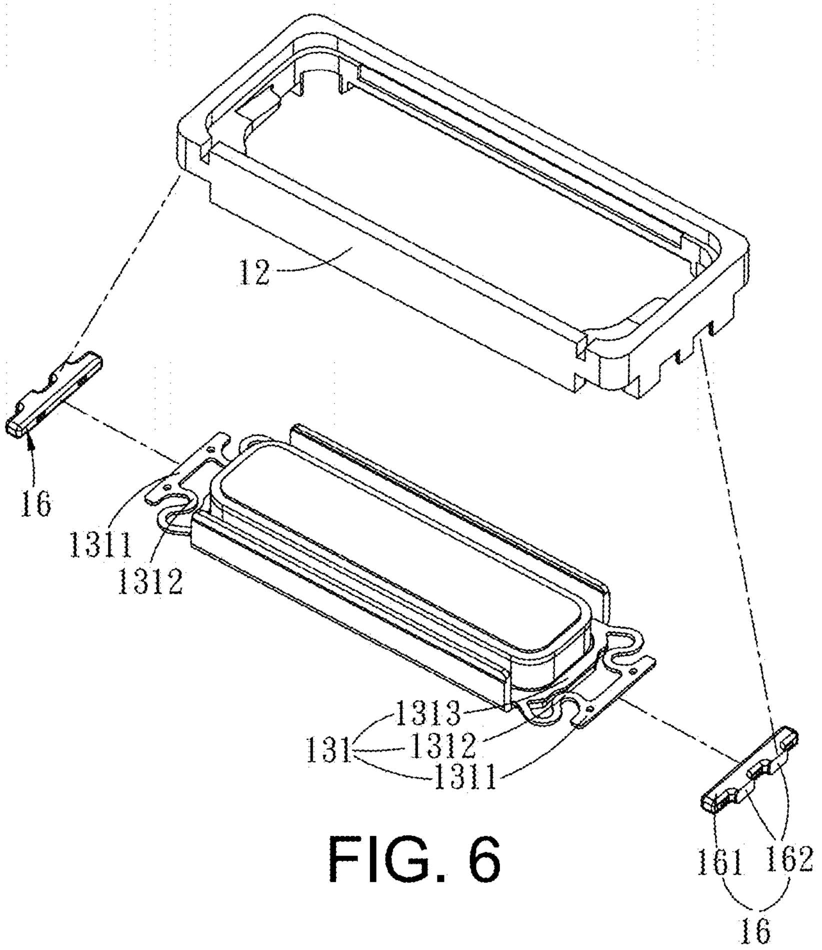
FIG. 6 is a partially exploded schematic diagram of a speaker of the second embodiment of the present disclosure.
Figure 7:
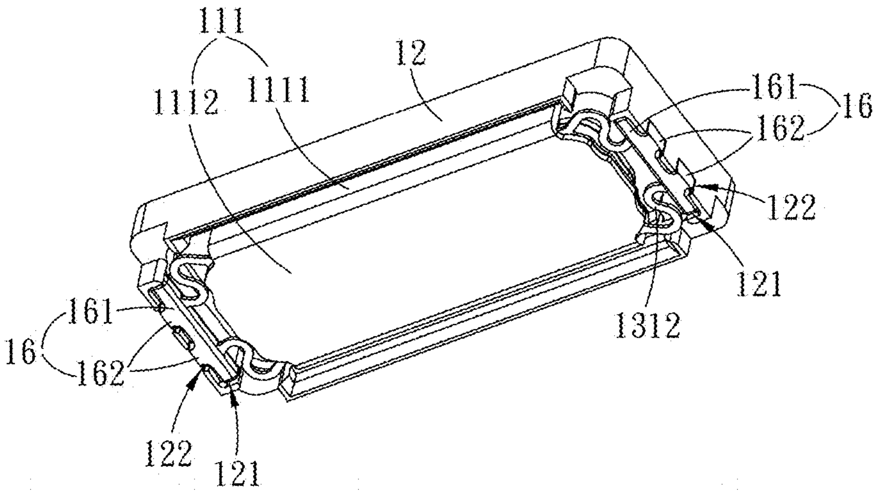
FIG. 7 is a partial schematic diagram of the speaker of the second embodiment of the present disclosure.

FIG. 6 is a partially exploded schematic diagram of a speaker of the second embodiment of the present disclosure. FIG. 7 is a partial schematic diagram of the speaker of the second embodiment of the present disclosure. As shown in the figures, the difference between this embodiment and the first embodiment is that a damper 16 is further included, and the damper 16 is disposed at a securing bracket 1311 of a first elastic member 131. So that the securing bracket 1311 can be secured to an outer frame 12 through the damper 16. The damper 16 further comprises a main body 161 and a securing bump 162, where the securing bump 162 is disposed at one side of the main body 161, and the main body 161 covers the securing bracket 1311. Besides, the outer frame 12 comprises a securing groove 121 and a securing notch 122, where the securing groove 121 is in communication with the securing notch 122, the main body 161 of the damper 16 is embedded in the securing groove 121, and the securing bump 162 of the damper 16 is embedded in the securing notch 122. The damper 16 could absorb the vibration from the first elastic member 131, thereby reducing the vibration caused by the first elastic member 131 on the outer frame 12. The damper 16 can be made of, but is not limited to, silicone material.

Figure 8:
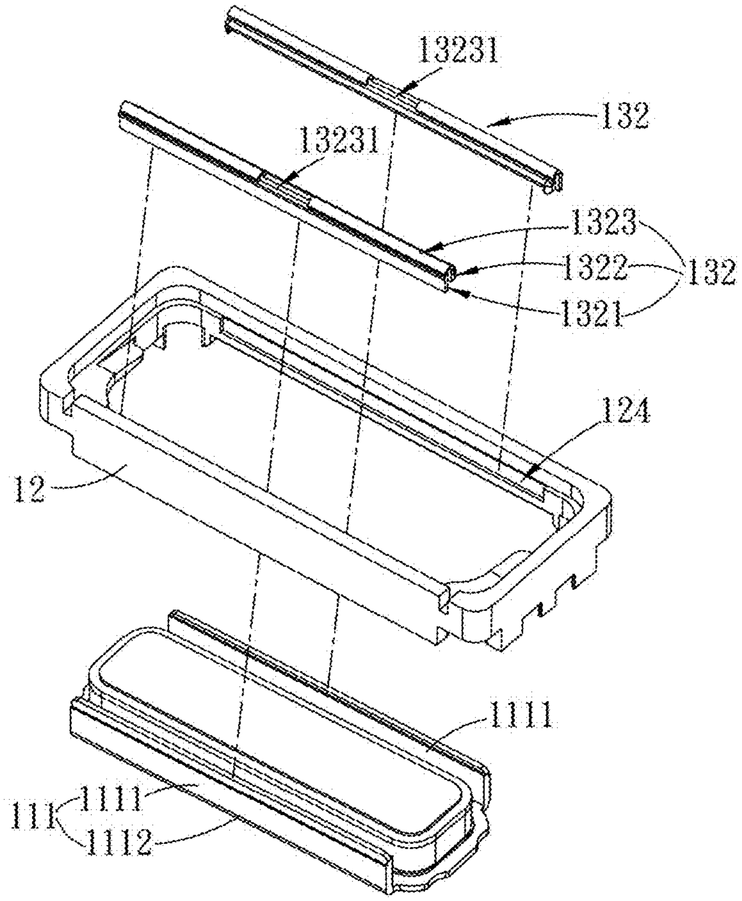
FIG. 8 is a partially exploded schematic diagram of a speaker of the third embodiment of the present disclosure.
Figure 9:
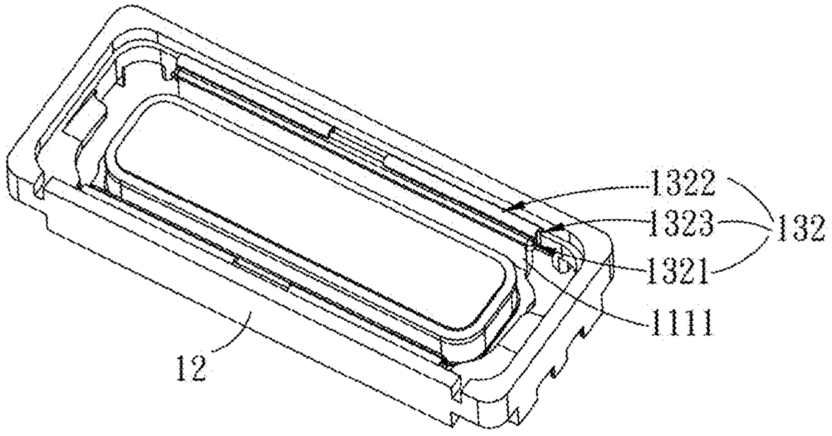
FIG. 9 is a partial schematic diagram of the speaker of the third embodiment of the present disclosure.

FIG. 8 is a partially exploded schematic diagram of a speaker of the third embodiment of the present disclosure. FIG. 9 is a partial schematic diagram of the speaker of the third embodiment of the present disclosure. As shown in the figures, the difference between this embodiment and the first embodiment is that the elastic component 13 comprises two second elastic members 132. In this embodiment, the two second elastic members 132 are interconnected with two sidewalls 1111 of a magnetic conductive carrying plate 111 and an outer frame 12. An inner side of the outer frame 12 is provided with a connecting notch 124, and the second elastic member 132 is a corrugated connecting component. The second elastic member 132 comprises a first connecting edge 1321, a second connecting edge 1322, and a bent part 1323. The bent part 1323 is connected between the first connecting edge 1321 and the second connecting edge 1322 in a bent manner. It should be further explained that since the second elastic member 132 is interconnected with the two sidewalls 1111 of the magnetic conductive carrying plate 111 and the outer frame 12, the overall length of the second elastic member 132 can be configured to be greater than half the length of an inner periphery of the corresponding outer frame 12 and/or half the length of the sidewall 1111, to stabilize the connection between the magnetic conductive carrying plate 111 and the outer frame. In other embodiments, the two sidewalls 1111 and the outer frame 12 can also be fixedly connected by a plurality of second elastic members 132, which are arranged at intervals. In this embodiment, the connection between the magnetic conductive carrying plate 111 and the outer frame can also be stabilized.

Figure 12:
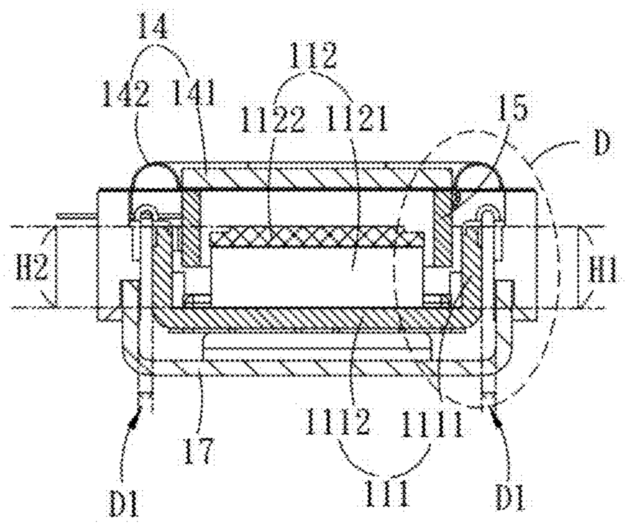
FIG. 12 is a cross-sectional view along line B-B' of FIG. 1.
Figure 13:
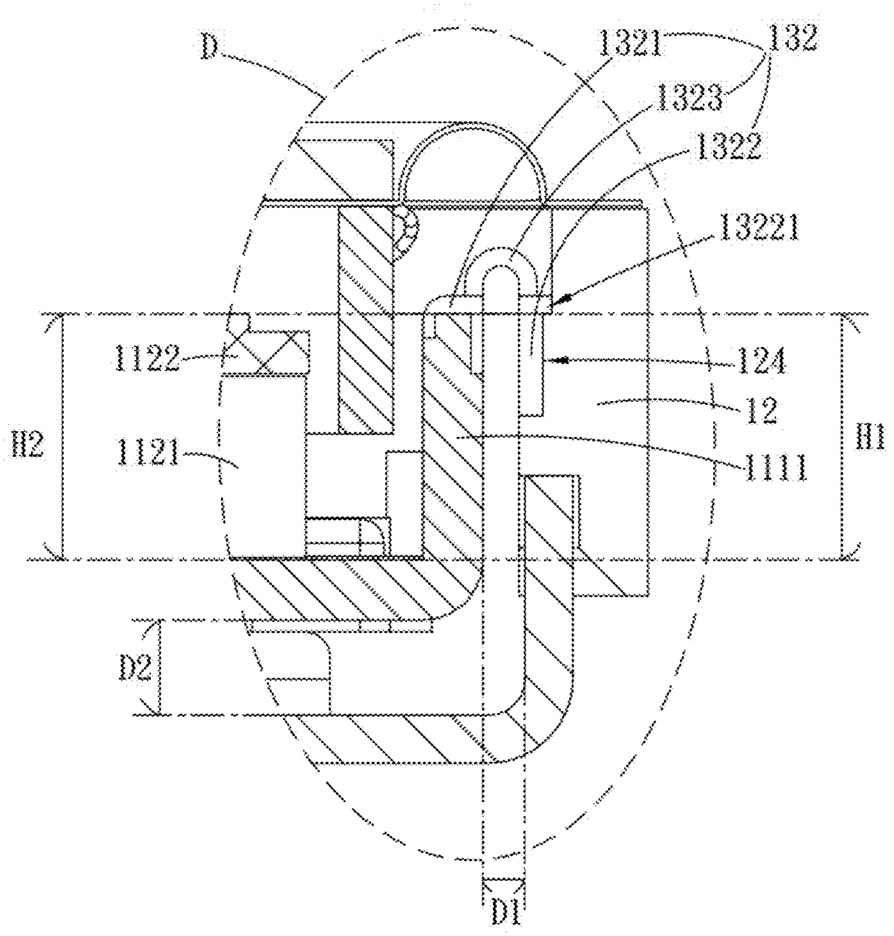
FIG. 13 is an enlarged view of area D of FIG. 12.

Refer to FIG. 12 and FIG. 13, the first connecting edge 1321 of the second elastic member 132 is fixedly connected to a top edge of the sidewall 1111 of the magnetic conductive carrying plate 111, where the first connecting edge 1321 covers the top edge of the sidewall 1111 of the magnetic conductive carrying plate 111. The second connecting edge 1322 of the second elastic member 132 is fixedly connected in the connecting notch 124, wherein one side of the second connecting edge 1322 corresponding to the connecting notch 124 further comprises a bump 13221, the second connecting edge 1322 is embedded in the connecting notch 124, and the bump 13221 is engaged above a sidewall of the connecting notch 124. In this way, the connection between the second connecting edge 1322 and the connecting notch 124 could be strengthened. The second elastic member 132 is a component extending along the sidewall 1111 of the magnetic conductive carrying plate 111, and can absorb vibration from the sidewall 1111 of the magnetic conductive carrying plate 111. In this way, the vibration on the outer frame 12 from the sidewall 1111 of the magnetic conductive carrying plate 111 can be reduced. The second elastic member 132 is made of silicone material.

Moreover, the number of the bent parts 1323 of the second elastic member 132 is multiple. The plurality of the bent parts 1323 are interconnected with the first connecting edge 1321 and the second connecting edge 1322. So, the connection between the sidewall 1111 of the magnetic conductive carrying plate 111 and the outer frame 12 can be reduced, that is, the degree of freedom between the magnetic component 11 and the outer frame 12 can be improved to enhance the absorbance of the vibration force by the second elastic member 132 transmitted from the magnetic component 11 to the outer frame 12. Meanwhile, a partitioning hole 13231 is provided between every two bent parts 1323, and the partitioning hole 13231 could balance the pressure and airflow during operation of the magnetic component 11 inside the outer frame 12 for heat dissipation. The number of the above-mentioned bent parts 1323 and the partitioning holes 13231 can be adjusted according to requirements.

Besides, the difference between this embodiment and the first embodiment and the second embodiment lies in the length of the connection of the elastic component 13 between the magnetic component 11 and the outer frame 12. In this embodiment, the connection length of the second elastic member 132 is relatively long, which strengthens the connection between the magnetic component 11 and the outer frame 12 to reduce the vibration amplitude of the magnetic component 11. However, the high connection strength of the second elastic member 132 means that the magnetic component 11 could better transmit the vibration force to the outer frame 12. On the contrary, when the connection strength of the first elastic member 131 in the first embodiment and the second embodiment is relatively low, the magnetic component 11 would be less restricted in connection, and the magnetic component 11 connected to the second elastic member 132 would have a greater vibration amplitude. In other words, the first elastic member 131 could better absorb the vibration of the magnetic component 11 to reduce the vibration disturbance on the outer frame 12 from the magnetic component 11.

Figure 10:
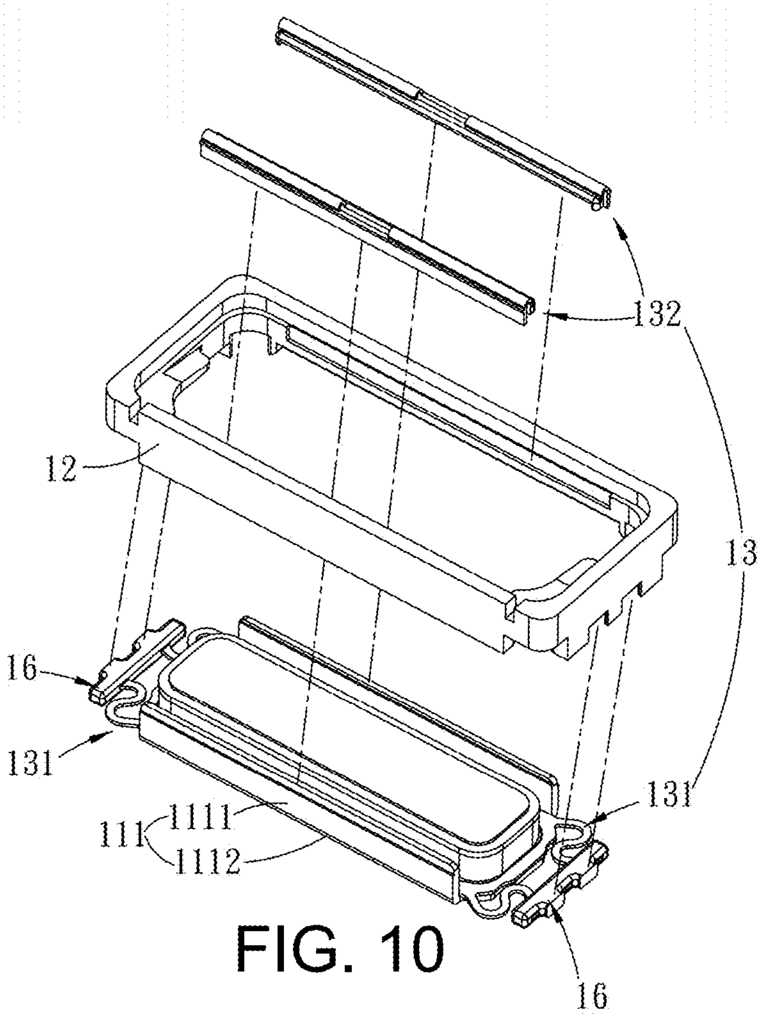
FIG. 10 is a partially exploded schematic diagram of a speaker of the fourth embodiment of the present disclosure.
Figure 11:
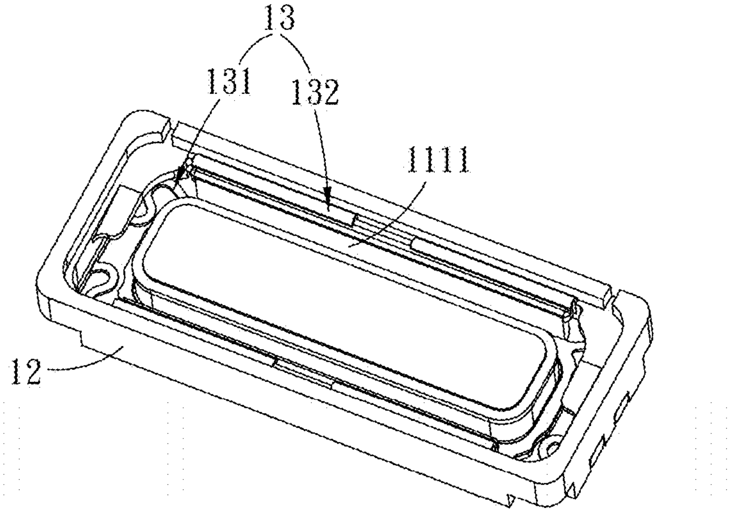
FIG. 11 is a partial schematic diagram of the speaker of the fourth embodiment of the present disclosure.

FIG. 10 is a partially exploded schematic diagram of a speaker of the fourth embodiment of the present disclosure. FIG. 11 is a partial schematic diagram of the speaker of the fourth embodiment of the present disclosure. As shown in the figures, this embodiment is a combined application of the first embodiment to the third embodiment. In this embodiment, an elastic component 13 comprises a first elastic member 131 and a second elastic member 132. The first elastic member 131 and the second elastic member 132 are respectively connected to the periphery of a magnetic component 11 so that the magnetic component 11 could be suspended in an outer frame 12. The structural configuration and effect of this embodiment are identical to those described in the first embodiment to the third embodiment, and thus would not be repeated herein.

FIG. 12 is a cross-sectional view along line B-B' of FIG. 1. FIG. 13 is an enlarged view of area D of FIG. 12. As shown in the figures, in this embodiment, a magnetic component 11 is disposed on a bottom plate 1112 of a magnetic conductive carrying plate 111 by a magnetic circuit module 112, which is disposed between two sidewalls 1111 of the magnetic conductive carrying plate. The magnetic circuit module 112 further comprises a magnetic body 1121 and a magnetic conductive plate 1122, where the magnetic body 1121 is disposed on the bottom plate 1112, and the magnetic conductive plate 1122 is disposed at the magnetic body 1121. The height H1 of each of the sidewalls 1111 is equal to the height H2 of the magnetic circuit module 112.

Figure 14:
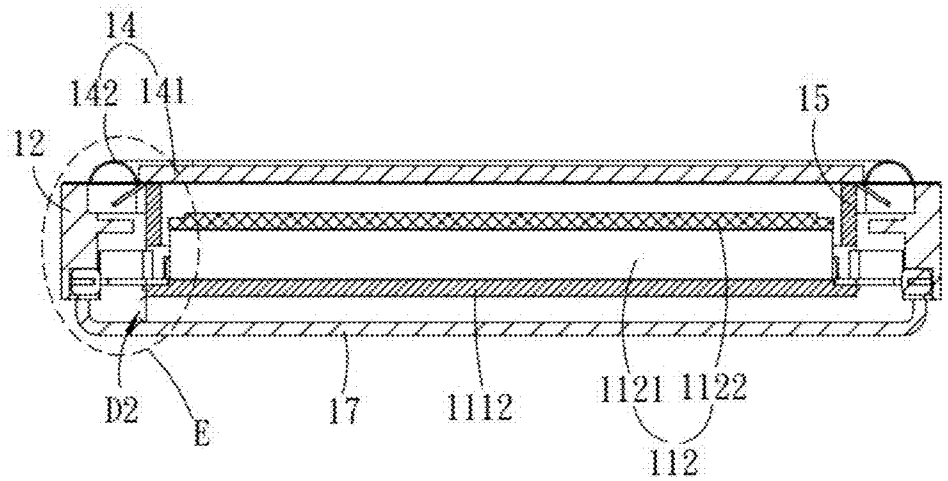
FIG. 14 is a cross-sectional view along line C-C' of FIG. 1.
Figure 15:
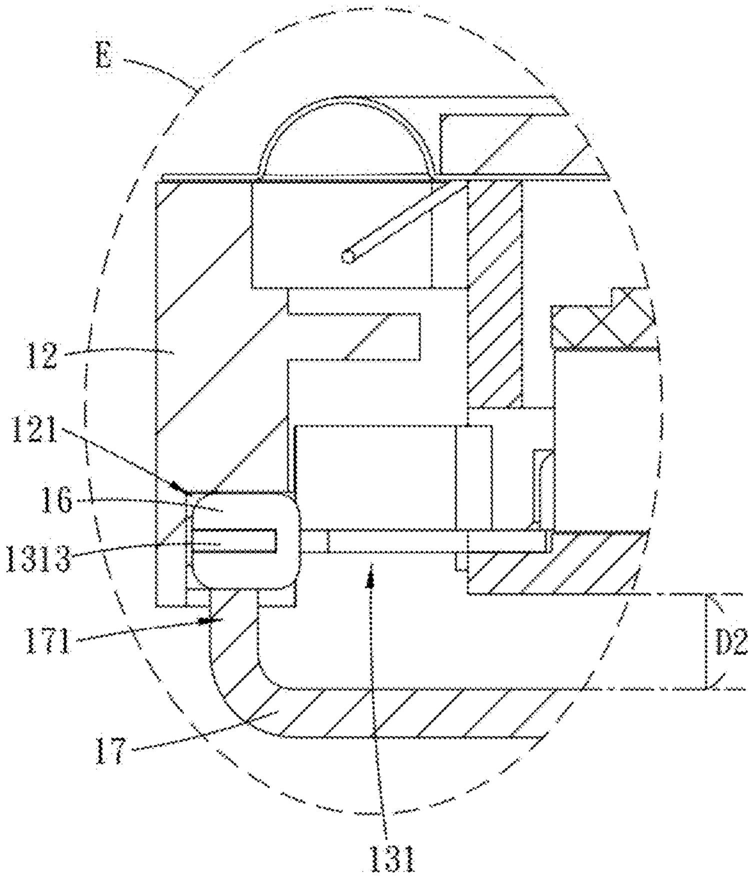
FIG. 15 is an enlarged view of area E of FIG. 14.

FIG. 14 is a cross-sectional view along line C-C' of FIG. 1. FIG. 15 is an enlarged view of area E of FIG. 14. As shown in the figure, the speaker 1 further comprises a bottom case 17, where the bottom case 17 is disposed under an outer frame 12 and is distant from a bottom plate 1112 of the magnetic conductive carrying plate 111 of the magnetic component 11 by a second distance D2. The space between the bottom case 17 and the magnetic component 11 provides air circulation, which enhances the heat convection so that the speaker 1 could have a better heat dissipation. Besides, the bottom case 17 is disposed under the outer frame 12 and comprises an abutment top 171 at a position corresponding to the damper 16, and the abutment top 171 abuts against the damper 16. In this way, the structural strength of the damper 16 secured in the securing groove 121 of the outer frame 12 can be enhanced.

In summary, embodiments of the present disclosure provide a speaker. The elastic component is interconnected between the magnetic component and the outer frame. When the magnetic component conducts electromagnetic induction to vibrate the voice coil and the vibrating component to sound, the magnetic component would vibrate by the same reactive force. At this time, as the vibration force of the magnetic component is transmitted to the outer frame through the elastic component, the vibration force is absorbed by the elastic component to reduce the influence on the outer frame. Thus, the vibrating component could be less influenced by the vibration of the outer frame.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A speaker, comprising:

a magnetic component comprising a magnetic conductive carrying plate and a magnetic circuit module, the magnetic conductive carrying plate comprising two sidewalls and a bottom plate, the two sidewalls being disposed on two side edges of the bottom plate, the magnetic circuit module being disposed on the bottom plate;

an outer frame disposed on a periphery of the magnetic component;

an elastic component interconnected with the magnetic conductive carrying plate and the outer frame, the elastic component being relatively disposed on two sides of the magnetic conductive carrying plate, and the elastic component comprising two second elastic members interconnected to the two sidewalls of the magnetic conductive carrying plate and the outer frame, wherein the elastic component comprises a first connecting edge, a second connecting edge, and a bent part; the bent part is interconnected to the first connecting edge and the second connecting edge in a bent manner; the first connecting edge is fixedly connected to a top edge of one of the two sidewalls of the magnetic conductive carrying plate;

a vibrating component disposed at the outer frame, the vibrating component being disposed at the magnetic component and the elastic component; and a voice coil disposed under the vibrating component, the voice coil being disposed between the magnetic circuit module and the two sidewalls of the magnetic conductive carrying plate;

wherein the two sidewalls are distant from the outer frame by a first distance; the magnetic component is disposed in the outer frame through a suspended connection by the elastic component.

2. The speaker according to claim 1, wherein the elastic component comprises two first elastic members that are interconnected to two ends of the magnetic conductive carrying plate not having the two sidewalls and the outer frame, respectively.

3. The speaker according to claim 2, wherein each of the first elastic members comprises a securing bracket, a connecting arm, and a connecting bracket; the securing bracket is connected to the outer frame; one end of the connecting arm is connected to the securing bracket; the other end of the connecting arm is connected to the connecting bracket; the connecting bracket is connected to the magnetic conductive carrying plate.

4. The speaker according to claim 3, wherein the connecting arm is a curved component; a side edge of the connecting bracket adjacent to the connecting arm comprises an avoidance notch.

5. The speaker according to claim 4, wherein the bottom plate of the magnetic conductive carrying plate comprises an avoiding part corresponding to the avoidance notch of the connecting bracket; the avoidance notch is communicating with the avoiding part.

6. The speaker according to claim 3, wherein the connecting bracket is bent toward the securing bracket; two ends of the connecting bracket are fixedly connected to the bottom plate.

7. The speaker according to claim 6, wherein an edge of the bottom plate extendingly protrudes in correspondence with the connecting bracket; the edge of the bottom plate is matchingly connected with one side of the connecting bracket.

8. The speaker according to claim 7, wherein one end of the bottom plate corresponding to the connecting bracket comprises a notch, in which the connecting bracket is correspondingly assembled.

9. The speaker according to claim 8, wherein at least one supporting bump extendingly protrudes from one side of the connecting bracket corresponding to the notch; the notch is provided with a connecting recess corresponding to the supporting bump; the supporting bump is engaged with the connecting recess.

10. The speaker according to claim 3 comprising a damper disposed at the securing bracket of the first elastic member, the securing bracket being fixedly connected to the outer frame through the damper.

11. The speaker according to claim 10, wherein the damper further comprises a main body and a securing bump; the securing bump is disposed at one side of the main body; the main body covers the securing bracket; the outer frame comprises a securing groove and a securing notch; the securing groove is in communication with the securing notch; the main body is embedded in the securing groove; the securing bump is embedded in the securing notch.

12. The speaker according to claim 10 comprising a bottom case disposed under the outer frame, the bottom case comprising an abutment top at a position corresponding to the damper, the abutting top abutting against the damper.

13. The speaker according to claim 1, wherein an inner side of the outer frame comprises a connecting notch; the second connecting edge is fixedly connected in the connecting notch.

14. The speaker according to claim 13, wherein the number of the bent parts is multiple; a partitioning hole is provided between every two bent parts.

15. The speaker according to claim 13, wherein the first connecting edge covers the top edge of one of the two sidewalls of the magnetic conductive carrying plate.

16. The speaker according to claim 13, wherein one side of the second connecting edge corresponding to the connecting notch further comprises a bump; the second connecting edge is embedded in the connecting notch; the bump is engaged above a sidewall of the connecting notch.

17. The speaker according to claim 1, wherein the height of each of the sidewalls is equal to the height of the magnetic circuit module.

18. The speaker according to any of claim 1 comprising a bottom case disposed under the outer frame, the bottom case being distant from the bottom plate of the magnetic conductive carrying plate of the magnetic component by a second distance.

19. The speaker according to claim 1, wherein the magnetic circuit module further comprises a magnetic body and a magnetic conductive plate; the magnetic body is disposed on the bottom plate; the magnetic conductive plate is disposed at the magnetic body.

* * * * *